United States Patent [19]
Broddevall

[11] 3,975,268
[45] Aug. 17, 1976

[54] METHOD OF LARGELY ELIMINATING VOLUME CHANGE IN A RESIN BED DUE TO CHANGES IN THE pH OF LIQUID EQUIPMENT BY USE OF RESIN MIXTURES WITH COMPENSATING PROPERTIES

[75] Inventor: Bengt Gunnar Broddevall, Skoghall, Sweden

[73] Assignee: Uddeholms Aktiebolag, Hagfors, Sweden

[22] Filed: Dec. 10, 1974

[21] Appl. No.: 531,368

[30] Foreign Application Priority Data
Dec. 13, 1973   United Kingdom ............... 57848/73

[52] U.S. Cl. .............................. 210/36; 260/2.1 C; 260/2.2 C; 260/838
[51] Int. Cl.² ...................... B01D 15/04; B01J 1/04
[58] Field of Search ............. 260/2.1 C, 838, 2.2 C; 210/32, 36; 162/37

[56] References Cited
UNITED STATES PATENTS

| | | | |
|---|---|---|---|
| 2,710,254 | 6/1955 | Van Biaricom et al. .............. | 162/37 |
| 2,732,352 | 6/1956 | Blaricon et al. ..................... | 260/2.1 |
| 3,420,709 | 1/1969 | Barrett, Jr. et al. ................. | 210/36 |
| 3,645,922 | 2/1972 | Weiss et al. .......................... | 260/2.1 |
| 3,652,407 | 3/1972 | Paleos ................................... | 210/27 |
| 3,853,758 | 12/1974 | Hurwitz et al. ..................... | 210/32 |
| R24,213 | 9/1956 | Van Biaricom et al. .............. | 162/37 |

OTHER PUBLICATIONS
"Duolite A-4F" Diamond Shamrock Co. 3/17/71 Bulletin 23.

*Primary Examiner*—Joseph L. Schofer
*Assistant Examiner*—Peter F. Kulkosky
*Attorney, Agent, or Firm*—Cushman, Darby & Cushman

[57] ABSTRACT

A method of bringing at least two liquids of different pH values into contact with a synthetic resin and substantially eliminating volume changes in the resin bed due to changes in the pH of the liquid phase, is provided wherein the resin is made up of a mixture of at least two different resins, the volumes of which depend on the pH of the liquid phase in which the resin is located, a first resin being one having its maximum volume when located in an acid environment and its minimum volume when located in an alkaline environment, a second resin being one having its minimum volume when located in an acid environment and its maximum volume when located in an alkaline environment, the ratio of the two resins in the mixture being such that volume changes in each resin resulting from changes in the pH of their environment substantially compensate one another so that the resin mixture maintains a substantially uniform volume in acid and alkaline environments.

12 Claims, No Drawings

METHOD OF LARGELY ELIMINATING VOLUME CHANGE IN A RESIN BED DUE TO CHANGES IN THE PH OF LIQUID EQUIPMENT BY USE OF RESIN MIXTURES WITH COMPENSATING PROPERTIES

The present invention relates to an improved method of contacting a liquid with a bed of a resin. More particularly, the invention relates to a method which will substantially eliminate volume changes in a bed of granular resin arranged in a column due to changes in the pH of the liquid phase e.g. during the use and regeneration of the resin.

It is known that both ion exchange resins and adsorbent resins undergo considerable volume changes in their use and regeneration due to changes in the pH of the liquid phase with which the resin is in contact. These volume changes can lead to the formation of channels in the resin bed when the bed shrinks. This is especially true in the case of ion exchange columns of large diameter. In the case of high, narrow columns, on the other hand, there is a risk of very strong pressures occurring in the resin bed when the bed swells, which can cause the resin particles to be crushed which, in turn, causes the resin to be quickly consumed.

Various proposals have been made in the past for solving these problems. One method that has been proposed is to divide the column into sections so that the relative height in each section is reduced. Another method is to provide compressible devices in the bed, see published Swedish Pat. No. 14907/72. A common complaint with these proposals however, is that they considerably complicate both the equipment and the progress of the interaction between the resin and the liquid.

The present invention is designed substantially to eliminate the volume changes and problems connected with this, by a method which does not require any interference with the structure of the resin column or associated equipment.

In U.S. application Ser. No. 491,668 filed July 25, 1974 by myself and E. A. S. Lindberg, a process is described for the purification of aqueous effluents arising in forest and other industries working with cellulose and containing lignin degradation products, particularly effluents arising in the chlorine bleaching of wood pulp. This purification involves passing the effluent through a bed of an ion exchange resin having pendant amino exchanging groups. This resin removes substantially all of the dark coloured lignin degradation products from the effluent and a substantially colourless effluent can be discharged. The load resin is subsequently regenerated by elution with a liquid which removes the dark coloured lignin degradation products bound to the resin. In the course of the repeated effluent decolouration and regeneration steps, the pH of the liquid in contact with the resin changes repeatedly from more than 7 to less than 7 and back again and problems of the above mentioned type result from volume changes in the resin. The practice of activating the resin with acid prior to decolouring the effluent, described in the above identified application, also tends to bring about volume changes in the resin. The present invention has been developed particularly for use in association with the process of the above mentioned patent application to minimise volume changes in the resin during use. The present invention is also particularly designed to solve practical problems connected with the activation of resin beds using acid activators and the substantial elimination of channel formation in the same resin beds in ion exchange columns used for decolouration of waste water from bleaching plants and from chemical or semi-chemical pulp factories, these waste waters containing both acid and alkali flows.

The present invention provides a process for bringing at least two liquids of different pH values into contact with a bed of synthetic resin and substantially eliminating volume changes in the resin bed due to changes in the pH of the liquid phase, wherein the resin is made up of a mixture of at least two different resins, the volumes of which depend on the pH of the liquid phase in which the resin is located, a first resin being one having its maximum volume when located in an acid environment and its minimum volume when located in an alkaline environment, a second resin being one having its minimum volume when located in an acid environment and its maximum volume when located in an alkaline environment, the ratio of the two resins in the mixture being such that volume changes in each resin resulting from changes in the pH of their environment substantially compensate one another so that the resin mixture maintains a substantially uniform volume in acid and alkaline environments.

The first fraction is preferably an ion exchange resin containing functional amino groups. These amino groups may consist predominantly of primary amino groups or predominantly of secondary amino groups or predominantly of tertiary amino groups.

A mixture of primary, secondary and tertiary amino groups can also be used. A mixture of secondary and tertiary amino groups can also be used. The resin can also have predominantly primary, secondary and/or tertiary amino groups and a smaller content of quaternary amino groups.

The first fraction is conveniently a phenol based resin, more precisely, a resin produced by condensation of phenol with an aldehyde, preferably a formaldehyde, in which the functional amino groups mentioned are arranged on the phenolic skeleton.

Resins of the above mentioned type are commercially available, for example, as various grades of Duolite resin e.g. A4-F, A-6, A7 and S37 manufactured by the Diamond Shamrock Chemical Co. of California U.S.A. and these resins are also described in the above mentioned earlier patent application.

The second fraction is preferably an adsorbent resin, i.e. a resin which does not work primarily through ion exchange but rather through Van der Waal forces. This type of resin is sometimes referred to as a molecular sieve.

The adsorbent resin fraction should also preferably have a phenolic matrix, e.g. should consist of a matrix of a phenol formaldehyde resin. Adhering hydroxyl groups may also be found on the adsorbent resin skeleton. This type of resin is also commercially available e.g. as Diamond Shamrocks Duolite S30.

To obtain a resin mass in which the volumetric changes of the various resin fractions compensate each other, the relative proportions of the two fractions are selected according to the degree of volume change of the fractions in question. If, for example, a resin is used which swells a certain percentage in an acid environment and another resin is used which swells by the same percentage in an alkaline environment, the resin bed may be composed of equal parts of both fractions.

If the volume changes of the two resins in acid and alkaline environments are not the same, then appropriate modification in the proportions of the two resins is required to give a resin mixture that will have a constant volume in an acid or an alkaline environment. A certain amount of routine experimentation will be necessary to establish the exact volume change that occurs in the selected resins under the pH conditions that will be during the use of the resin but once this has been established, a simple calculation will give the necessary proportions for a constant volume mixture.

The present invention may be used in association with the effluent decolouration process of the above mentioned earlier patent application. In particular, bleach plant effluent containing dark coloured lignin degradation products can be decoloured using the constant volume resin mixture in accordance with this invention. Most of the pollutants that arise in the bleaching of wood pump arise in the first alkali extraction stage. When purifying this effluent in accordance with the procedure of the above mentioned earlier patent application, it is customary to activate the resin, prior to decolouring the effluents by passing aqueous acid through the resin bed and to elute the loaded resin, after the effluent has been decoloured, by passing an aqueous alkali solution through the resin bed. The pH changes that occur in these procedures, make the use of a constant volume resin in accordance with the present invention very valuable.

Apart from the use of a constant volume resin, when the present invention is to be used in association with the process of the above mentioned earlier patent application, the other reaction conditions may be as described in the above mentioned earlier patent application; these conditions include the acid activation of the resin, the control of pH of the various solutions to be brought into contact with the resin, the flow rates of the various solutions through the resin, the elution of the resin and the disposal of the pollutants after resin elution.

The following Example is given to illustrate the invention when used to remove coloured lignin degradation products from the aqueous effluent from a pulp bleaching plant.

EXAMPLE

The resin bed is composed of a mixture of two resins. The first resin is Duolite A-6 which has a matrix consisting of a "cross-linked" granular phenol formaldehyde resin containing pendant tertiary amino groups. The second resin is Duolite S-30 which is a granular resin with the same matrix as Duolite A-6, but without the pendant amino groups. The second resin may contain pendant hydroxyl groups and is more precisely a so-called adsorbent resin as opposed to an ion exchange resin. The Duolite A-6 resin has in one normal $H_2SO_4$ a volume about 30% greater than in one normal NaOH. The Duolite S-30 resin, on the other hand, has a volume approximately 40% greater in one normal NaOH than in one normal $H_2SO_4$. By making a resin mixture which in one normal NaOH consists almost 49% by volume of Duolite A-6 resin and the remainder of Duolite S-30 resin, a mixture is obtained which in one normal $H_2SO_4$ has a largely unchanged volume. The relations or ratios between the resin fractions have changed, however, so that now just over 63% by volume of the mixture consists of Duolite A-6 mentioned and the remainder Duolite S-30 resin mentioned.

In the operation of an ion exchanger column containing a resin mixture according to the invention, at least two alternatives are possible, either the bed is activated with an acid solution before the liquid to be treated by the ion exchanger Duolite A-6 is fed in, for example an aqueous effluent from the timber industry, or the ion exchanger is first activated with the liquid to be treated by the ion exchanger. The first case is preferably used when the liquid to be treated is alkaline or is not sufficiently acidic to activate the resin. One example of such a case is the treatment of waste water from the first alkali extraction stage in a conventional chlorine bleaching plant in a chemical or semi-chemical pulping process which is aimed at eliminating coloured products arising from lignin decomposition. One example of the second case is the treatment of the collected acid waste from a bleaching plant of the type mentioned or the waste from both the initial stages in the bleaching process, namely a chlorine bleaching stage and an alkali extraction stage, both of which together produce an acid solution.

An advantage of using a mixture of an ion exchange resin containing amino groups and an adsorbent resin is that the amino groups are able to bind acid in the resin bed so that the adsorbent resin can also effectively contribute to the adsorption of the substances to be removed from the liquid to be treated. The need for activating the adsorbent resin during the course of the process can therefore be obviated or at least greatly reduced. This makes it possible to use an adsorbent resin even for treating non-acid liquids, if the composite resin is activated in advance. At the same time it is also possible to treat acid solutions with the composite resin, which makes it extremely flexible in its application and at the same time reduces the need for additional chemicals compared with resin beds consisting of simple resins.

I claim:
1. A method of treating at least two liquids of different pH values with a bed of a mixture of at least two synthetic resins and substantially eliminating volume changes in the resin bed due to changes in the pH of the liquid phase, wherein the resin mixture is brought into contact with a first liquid, the resin mixture and first liquid separated from one another and the resin mixture then brought into contact with a second liquid, one of the first and second liquids having a pH greater than 7 and the other of the first and second liquid having a pH less than 7, and wherein the resin is made up of a mixture of at least two different resins, the volumes of which depend on the pH of the liquid phase in which the resin is located, a first resin being an ion exchange resin containing pendant amino groups and having its maximum volume when located in an acid environment and its minimum volume when located in an alkaline environment, a second resin being an adsorbent resin and not an ion exchange resin and having its minimum volume when located in an acid environment and its maximum volume when located in an alkaline environment, the ratio of the two resins in the mixture being such that volume changes in each resin resulting from changes in the pH of their environment substantially compensate one another so that the resin mixture maintains a substantialy uniform volume in acid and alkaline environments.

2. A method according to claim 1, wherein said amino groups predominantly are primary amino groups.

3. A method according to claim 1, wherein said amino groups predominantly are secondary amino groups.

4. A method according to claim 1, wherein said amino groups predominantly are tertiary amino groups.

5. A method according to claim 1, wherein said amino groups predominantly are a mixture of primary, secondary and tertiary amino groups.

6. A method according to claim 1, wherein said amino groups predominantly are a mixture of secondary and tertiary amino groups.

7. A method according to claim 1, wherein said amino groups predominantly are primary, secondary and/or tertiary amino groups and also a smaller content of quaternary amino groups.

8. A method according to claim 1, wherein the first resin has a matrix produced by condensation of phenol with an aldehyde and the amino groups present as pendant groups on the matrix.

9. A method according to claim 8, wherein the matrix is a phenol/formaldehyde condensate.

10. A method according to claim 1, wherein the adsorbent resin has a matrix, which is a phenol formaldehyde condensate.

11. A method according to claim 10, wherein hydroxyl groups are present as pendant groups on the matrix.

12. A method according to claim 1, wherein the resin mixture is in the form of a bed in an ion exchange column and a first liquid is passed through the resin bed and then a second liquid of different pH to the first liquid is passed through the resin bed.

* * * * *